US006313578B1

(12) United States Patent
Mishra et al.

(10) Patent No.: US 6,313,578 B1
(45) Date of Patent: Nov. 6, 2001

(54) PHOSPHOR COATING FOR GAS DISCHARGE LAMPS AND LAMP CONTAINING SAME

(75) Inventors: Kailash C. Mishra, N. Chelmsford, MA (US); Harold Rothwell, Jr., Hopkinton, NH (US); Thomas E. Peters, Chelmsford, MA (US); Jean M. Evans, North Hampton, NH (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/162,192

(22) Filed: Sep. 28, 1998

(51) Int. Cl.⁷ ........................................................ H01J 1/62
(52) U.S. Cl. ........................ 313/485; 313/486; 313/635
(58) Field of Search .................... 313/485, 483, 313/484, 486, 487, 635, 493, 496, 497, 467; 252/301.4 R, 301.4 H, 301.4 F, 301.4 S, 301.6 R, 301.6 F, 301.6 P, 301.6 S; 428/403, 367

(56) References Cited

U.S. PATENT DOCUMENTS

| | | | |
|---|---|---|---|
| 2,987,414 | 6/1961 | Martyny | 117/33.5 |
| 3,551,180 | 12/1970 | Margolis | 117/33.5 |
| 4,340,512 | 7/1982 | Schreurs | 523/122 |
| 5,455,489 | 10/1995 | Bhargava | 315/169.4 |
| 5,460,701 | 10/1995 | Parker et al. | 204/164 |
| 5,518,808 | * 5/1996 | Bruno et al. | 428/323 |
| 5,565,741 | 10/1996 | Jennato et al. | 315/246 |
| 5,650,691 | 7/1997 | Jansma | 313/485 |
| 5,923,118 | * 7/1999 | Jennato et al. | 313/485 |

FOREIGN PATENT DOCUMENTS 0 479 300 A1   4/1992   (EP) .............................. C09K/11/02

* cited by examiner

Primary Examiner—Michael H. Day
Assistant Examiner—Joseph Williams
(74) Attorney, Agent, or Firm—Robert F. Clark

(57) ABSTRACT

A phosphor coating for gas discharge lamps is provided. The phosphor coating contains a nano-size phosphor which promotes adherence of the primary phosphor to the glass envelope. The phosphor coating is applied to the interior surface of the gas discharge lamp using an aqueous suspension containing the primary phosphor, the nano-size phosphor, and an organic binder.

20 Claims, 1 Drawing Sheet

PHOSPHOR COATING FOR GAS DISCHARGE LAMPS AND LAMP CONTAINING SAME

TECHNICAL FIELD

This invention is related to phosphor coatings for gas discharge lamps. In particular, this invention is related to the binder materials used in phosphor coatings for gas discharge lamps.

BACKGROUND ART

Examples of phosphor coating methods for gas discharge lamps are described in U.S. Pat. Nos. 3,551,180, 2,987,414, 4,340,512, and in European Patent Application EP 0 479 300 A1. Generally, the phosphor particles contained in the coating layer do not adhere well by themselves to the glass envelopes used in gas discharge lamps without the aid of a suitable binding agent. In fluorescent lamps, the binding agent consists of a polymeric material, such as polyethelyene oxide, and a finely divided, high surface area, aluminum oxide. A generally preferred aluminum oxide binder is Aluminum Oxide C (available from Degussa) which is a gamma aluminum oxide, $\gamma$-$Al_2O_3$, having a particle size of about 20 nm. An aqueous coating suspension containing these binding agents and an ultraviolet (UV) stimuable phosphor is applied to the interior surface of the glass envelope and dried to form a phosphor coating layer. The polymeric binder is removed from the coating layer during a subsequent high temperature lamp baking operation. The aluminum oxide binder is not removed during the subsequent processing steps and remains in the phosphor coating layer of the finished lamp.

The presence of aluminum oxide in the phosphor layer does not pose a significant problem for fluorescent lamps. For example, $\gamma$-$Al_2O_3$ is nearly transparent to the 254 nm resonance radiation generated by the mercury discharge. (The optical gap or $\alpha$-$Al_2O_3$ is in the vicinity of 200 nm and shifts to longer wavelengths, >185 nm, for $\gamma$-$Al_2O_3$.) Thus, the aluminum oxide improves the adherence of the coating layer without absorbing the UV radiation used to excite the phosphor. This situation changes however for other types of gas discharge lamps which utilize UV radiation occurring in the vacuum ultraviolet (VUV), region, less than about 170 nm (e.g., Xe excimer and neon gas discharge lamps). In those lamps, the aluminum oxide in the phosphor coating absorbs VUV radiation emitted from the gas discharge. Unlike the phosphor in the coating, the VUV radiation absorbed by the $\gamma$-$Al_2O_3$ is not converted to visible radiation but is instead dissipated through non-radiative loss processes associated with the bulk material. Hence, in VUV applications, the presence of aluminum oxide in the phosphor coating causes a reduction in lamp efficacy. If the aluminum oxide binder is removed from the phosphor coating, the lamp efficacy increases but the coating easily falls off the lamp envelope. Thus, it would be an advantage to have a binding agent which provides adherence characteristics similar to finely dividied, high surface area, aluminum oxide without causing a significant reduction in lamp efficacy.

SUMMARY OF THE INVENTION

It is an object of the invention to obviate the disadvantages of the prior art.

It is an object of the invention to provide a phosphor coating having an inorganic binder which exhibits adherence characteristics comparable to Aluminum Oxide C.

It is a further object of the invention to provide a gas discharge lamp having increased efficacy.

In accordance with one object of the invention, there is provided a phosphor coating for a gas discharge lamp comprising a primary phosphor and an inorganic binder, the inorganic binder comprising a nano-size phosphor, and the primary phosphor emitting visible light upon stimulation by VUV radiation.

In accordance with another object of the invention, there is provided a gas discharge lamp comprising an envelope formed of a light transmissive material, the envelope having a wall defining an enclosed volume, the enclosed volume containing a gas fill, the gas being capable of emitting VUV radiation when stimulated, and a phosphor coating comprising a primary phosphor and an inorganic binder, the inorganic binder comprising a nano-size phosphor, and the primary phosphor emitting visible light upon stimulation by VUV radiation.

In accordance with still another aspect of the invention, the nano-size phosphor in the phosphor coating has a total VUV absorbance over a range of VUV wavelengths which is less than the total VUV absorbance of gamma aluminum oxide over the same wavelength range.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

The primary difficulty encountered in searching for a substitute for the aluminum oxide binder is that almost all materials absorb radiation below 100 nm. Absorption by the host lattice in this region is stronger than that of the isolated activator ions in the lattice and the absorbed radiation is usually lost in non-radiative relaxation. Thus, it is almost impossible to find a material that is as transparent to VUV radiation as $\gamma$-$Al_2O_3$ is to 254 nm radiation.

Another difficulty stems from a lack of understanding of how the aluminum oxide binder enhances the adhesion between the phosphor and the glass envelope. There are several theories with regard to the role of aluminum oxide in a phosphor coating. One theory is that in the aqueous coating suspension aluminum oxide undergoes a chemical change, possibly hydration, which helps bind the phosphor particles to the glass. Another theory is that the size of the aluminum oxide particles enhances adhesion because of an increased van der Waals interaction between the particles and the glass. Such a physisorption process can be understood within the framework of the Hamakar theory of dispersion forces (R. J. Hunter, *Foundations of Colloid Science*, Clarendon Press, Oxford (1989))

We have found that nano-size phosphors having a particle size from about 10 nm to about 150 nm, with a preferred range from about 75 nm to about 125 nm, can replace aluminum oxide as a binding agent in phosphor coatings and provide an improvement in lamp efficacy. Phosphor coatings containing nano-size phosphors exhibit adherence properties similar to those exhibited by coatings containing aluminum oxide binders. It is believed that nano-size phosphors may improve lamp efficacy in several ways, including: converting absorbed VUV radiation into visible light, reducing VUV absorption, and/or reducing the amount of binder required. In particular, nano-size europium activated yttrium oxide ($Y_2O_3$:Eu) phosphor has been shown to provide adherence comparable to Aluminum Oxide C while providing an increase in lamp efficacy. Nanocrystal phosphors and methods for making nanostructured materials are described in U.S. Pat. Nos. 5,455,489 and 5,460,701.

Figure 1:
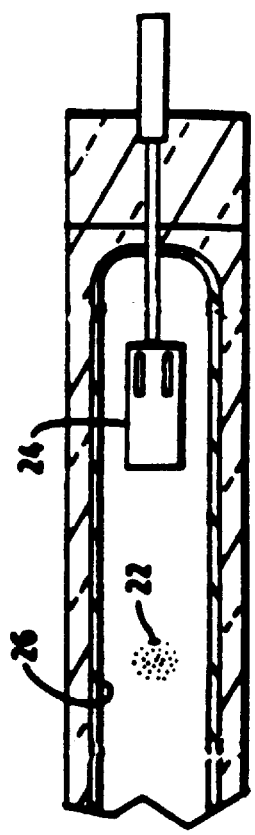
FIG. 1 is an cross-sectional diagram of a neon gas discharge lamp.
Figure 1:
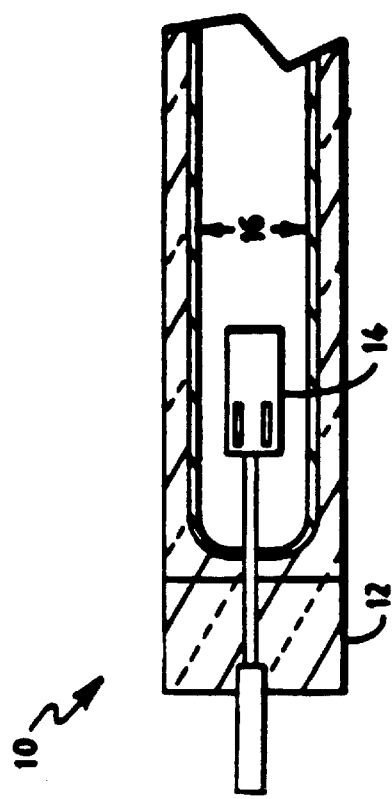

As described above, the phosphor coating is applied to the interior surface of a gas discharge lamp. Such a coating is shown in FIG. 1 which is an illustration of a neon gas discharge lamp, partially broken away. The neon lamp 10 is assembled from a tubular envelope 12, a first electrode 14, a neon gas fill 22, a second electrode 24, and a phosphor coating 26. The lamp is operated by a source of electrical power not shown. The tubular envelope 12 may be made out of hard glass or quartz to have the general form of an elongated tube. The preferred glass is an alumina silicate glass, a "hard glass," available from Corning Glass Works, and known as type 1724. The inside diameter 16 of envelope 12 nay vary from 2.0 to 10.0 millimeters, with the preferred inside diameter 16 being about 3.0 to 5.0 millimeters. At one end of the tubular envelope 12 is a first sealed end. The first sealed end entrains the first electrode 14. The preferred first sealed end is a press seal capturing the first electrode 14 in the hard glass envelope. Positioned at the opposite end of the tubular envelope 12 is a second sealed end. The second sealed end may be formed to have substantially the same structure as the first seal, capturing a similarly formed second electrode 24. In order to generate an amber emission color, the lamp envelope is coated with phosphor 26 which emits green light in response to the ultraviolet radiation lines of neon. Phosphor 26 may be attached to the interior surface of envelope 12 by known conventional aqueous suspension coating techniques. Depending upon the application, the primary phosphor for emitting visible light in response to the VUV stimulus may comprise a single phosphor or a blend of phosphors.

The following examples are provide for the purpose of illustration and are not to be considered as a limitation upon the invention.

EXAMPLES

Two different samples of nano-size $Y_2O_3$:Eu phosphor were evaluated. Both samples exhibited a barely visible red $Eu^{3+}$ emission under 254 nm radiation. Sample #1 was whitened by heating in air. However, it still maintained a noticeably gray body color that persisted in the coating suspension. The gray body color was eliminated in the binder burn out stage during lamp fabrication. Sample #2 was heat treated at 1125° C. to promote the formation of the more strongly fluorescent cubic form. The particle size of sample #2 (about 120 nm) was approximately 50% larger than that of sample #1 (about 85 nm). The nano-size phosphors were made using a gas phase condensation method. Although the efficiency of these phosphors is poor in comparison with the commercial micron-sized $Y_2O_3$:Eu phosphors (typically 4–6 μm), other investigators have reported nano-sized phosphors having efficiencies comparable to the bulk material.

These nano-size phosphor samples were used to replace Aluminum Oxide C in a standard aqueous coating suspension containing a polyethylene oxide binding agent and a cerium activated yttrium aluminum garnet phosphor, $Y_3Al_5O_{12}$:Ce, (Sylvania Type 251). The substitution was made on a molar rather than a weight basis. The aqueous suspension normally contains about 5.6 weight percent (wt. %) of Aluminum Oxide C based on the weight of the phosphor. The Aluminum Oxide C is added as an aqueous suspension that includes a small amount of a dispersant. The molar equivalent of the nano-size $Y_2O_3$:Eu phosphor replacing the Aluminum Oxide C was therefore about 12.4 wt. % based on the weight of the phosphor.

When mixed with water, sample #1 formed a paste, the formation of which may have been enhanced by the addition of a dispersant. Part of the polyethylene oxide vehicle used to adjust the specific gravity of the suspension was used to facilitate the dispersion of this sample. Nevertheless curds were observed subsequently in the suspension and it was necessary to remove them by wet sieving. Sample #2 behaved more like a conventional phosphor, settling out relatively quickly upon standing. Apparently, the post-synthesis heat treatment coarsened the particles enough to inhibit the formation of a suspension similar to that observed for the Aluminum Oxide C. A phosphor coating suspension made with Aluminum Oxide C was used for comparison.

Six lamp blanks (3 mm I.D.) were coated with each suspension. To evaluate the adhesion of the phosphor layer, blow tests were performed on two blanks from each set. Air was blown through the coated tubes at increasingly higher velocities until the phosphor coating began to fall off. The velocity of the air flowing through the tube at the first visible sign of phosphor loss is given in Table 1. Data on neon gas discharge lamps made from the remaining blanks are also given in Table 1. The lamps were constructed similarly to those described in U.S. Pat. No. 5,523,655 to Jennato et al. which is incorporated herein by reference.

TABLE 1

| Lamps | Binding Agent | Blow Test SCFH | Lumen Output at 20 Watts |
|---|---|---|---|
| 805A | sample #1 | 45–50 | 280 |
| 805B | sample #2 | 25–30 | 280 |
| Standard | Aluminum Oxide C | 50+ | 230 |

The results in Table 1 clearly demonstrate that the use of nano-size phosphors can produce coating adhesion equivalent to that obtained with Aluminum Oxide C while achieving an increase in lamp efficacy. Since no $Eu^{3+}$ emission was detected from the lamps containing the nano-size phosphor as the binding agent, it is not possible to directly attribute the increased brightness of these lamps to emissions from the nano-size phosphors. More likely, the increase in efficacy is the result of reduced VUV absorption by the binder. Lamps made without an Aluminum Oxide C or a nano-size phosphor binder also experienced an increase in efficacy similar to the lamps containing the nano-size phosphor binder. However, the coating layers in those lamps were adhered poorly to the glass.

Since the absorption tail of Aluminum Oxide C extends beyond 185 nm, a suitably chosen nano-size phosphor may reduce any loss experienced in mercury vapor discharge lamps from the absorption of 185 nm radiation. Thus, while it is anticipated that lamps utilizing VUV radiation will benefit the most from this invention, this scope of this invention is not limited to those applications.

While there has been shown and described what are at the present considered the preferred embodiments of the invention, it will be obvious to those skilled in the art that various changes and modifications may be made therein without departing from the scope of the invention as defined by the appended claims.

We claim:

1. A phosphor coating for a gas discharge lamp comprising:

a primary phosphor and an inorganic binder, the inorganic binder comprising a nano-size phosphor having a particle size from about 10 nm to about 150 nm, and the primary phosphor emitting visible light upon stimulation by VUV radiation.

2. The phosphor coating of claim 1 wherein the nano-size phosphor emits visible light upon stimulation by VUV radiation.

3. The phosphor coating of claim 1 wherein the nano-size phosphor has a total VUV absorbance over a range of VUV wavelengths which is less than the total VUV absorbance of gamma aluminum oxide over the same wavelength range.

4. The phosphor coating of claim 1 wherein the phosphor coating exhibits an adherence which is equivalent to or greater than a similar coating wherein the nano-size phosphor has been replaced with a molar equivalent amount of an aluminum oxide binder, the aluminum oxide binder consisting of particles of a gamma aluminum oxide having a particle size of about 20 nm.

5. The phosphor coating of claim 1 wherein the nano-size phosphor is a europium activated yttrium oxide.

6. The phosphor coating of claim 5 wherein the primary phosphor is a cerium activated yttrium aluminum garnet.

7. The phosphor coating of claim 5 wherein the nano-size phosphor has a particle size of from about 75 nm to about 125 nm.

8. The phosphor coating of claim 7 wherein the nano-size phosphor is made by gas phase condensation.

9. The phosphor of claim 1 wherein the primary phosphor is a blend of phosphors.

10. The phosphor coating of claim 1 wherein the coating is produced by:

forming an aqueous suspension of the primary phosphor, the nano-size phosphor, and an organic binder;

applying the suspension to the gas discharge lamp to form a coating layer;

drying the coating layer; and baking the coating layer to remove the organic binder.

11. The phosphor coating of claim 10 wherein the organic binder is polyethylene oxide.

12. A gas discharge lamp comprising:

an envelope formed of a light transmissive material, the envelope having a wall defining an enclosed volume, the enclosed volume containing a gas fill, the gas being capable of emitting VUV radiation when stimulated; and a phosphor coating comprising a primary phosphor and an inorganic binder, the inorganic binder comprising a nano-size phosphor having a particle size from about 10 nm to about 150 nm, and the primary phosphor emitting visible light upon stimulation by VUV radiation.

13. The lamp of claim 12 wherein the wall has at least one electrode extending therethrough to contact the enclosed volume.

14. The lamp of claim 12 wherein the efficacy of the lamp is equivalent to or greater than a similar lamp having a similar phosphor coating wherein the nano-size phosphor has been replaced with a molar equivalent amount of an aluminum oxide binder, the aluminum oxide binder consisting of particles of a gamma aluminum oxide having a particle size of about 20 nm.

15. The lamp of claim 12 wherein the nano-size phosphor is a europium activated yttrium oxide.

16. The lamp of claim 15 wherein the primary phosphor is a cerium activated yttrium aluminum garnet and the gas fill is comprised of neon.

17. The lamp of claim 15 wherein the nano-size phosphor has a particle size of from about 75 nm to about 125 nm.

18. The lamp of claim 12 wherein the nano-size phosphor emits visible light upon stimulation by VUV radiation.

19. The lamp of claim 12 wherein the nano-size phosphor has a total VUV absorbance over a range of VUV wavelengths which is less than the total VUV absorbance of gamma aluminum oxide over the same wavelength range.

20. The lamp of claim 12 wherein the primary phosphor is a blend of phosphors.

* * * * *